Oct. 21, 1930.  E. SYLVANNE  1,779,343

SNAP FOR TROLLING LINES

Filed June 5, 1929

INVENTOR.
Erkki Sylvanne,
BY
Geo. P. Kimmel
ATTORNEY.

Patented Oct. 21, 1930

1,779,343

UNITED STATES PATENT OFFICE

ERKKI SYLVANNE, OF ASTORIA, OREGON

SNAP FOR TROLLING LINES

Application filed June 5, 1929. Serial No. 368,676.

This invention relates to snaps used for connecting hooks to the leaders of trolling lines and has for its primary object to provide, in a manner as hereinafter set forth, a snap to which a leader may be quickly secured and in which the leader is securely locked against accidental displacement.

A further object of the invention is to provide a device designed primarily for the purpose aforesaid, which is adapted to be manufactured in a variety of sizes and which is capable of being used in its larger sizes as a hook for hoisting lines.

With the foregoing and other objects in view, the invention consists of the novel construction, combination and arrangement of parts as hereinafter more particularly described, and as illustrated in the accompanying drawings wherein is shown an embodiment of the invention, but it is to be understood that such description and drawings are to be taken as illustrative and that the invention is intended to be limited only by the scope of the claims hereunto appended.

In the accompanying drawings in which like numerals are employed to designate like parts throughout the same:

Figure 1:
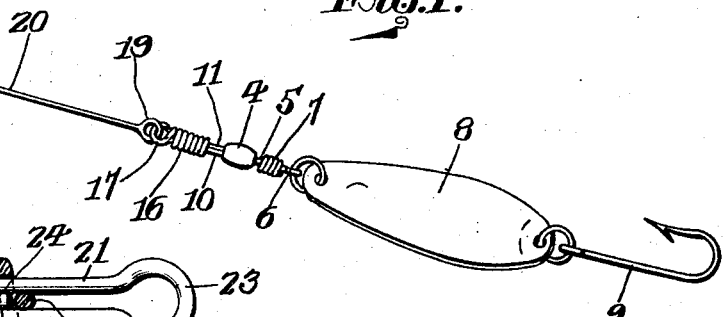
Figure 1 is a perspective view of a snap in accordance with this invention, showing the same in association with a leader, spinner and hook.

Referring to the drawings in detail, the numeral 1 designates generally my improved snap consisting of end portions 2 and 3 respectively, which are connected together, preferably by a swivel 4. The end portion 2 consists of a shank 5 rotatably mounted with respect to the swivel 4, an eye 6 formed at the outer end of the shank, and a coiled portion 7 encircling the shank and merging with the eye 6. The eye 6 is adapted to be connected with a spinner, such as 8, to which a hook 9 may be secured. If desired the spinner 8 may be eliminated and the hook 9 connected directly with the eye 6.

The end portion 3 consists of a pair of shanks 10 and 11 disposed in parallel relation and preferably secured together by solder or the like. The shank 11 is of materially less length than the shank 10 and the outer end thereof is beveled, as indicated at 12. The shank 10 is formed with a loop 13 which merges into a return portion 14, the free end of which is beveled as indicated at 15 and terminates adjacent and opposed to the beveled end 12 of the shank 11.

Slidably mounted on the shanks 10 and 11 is a latch member 16 which is preferably formed with a series of coils and which terminates at its outer end in a hook 17, the outer end of which is beveled as indicated at 18 and terminates in spaced relation and at substantially a right angle to the outermost coil of the latch member 16.

Figure 3:
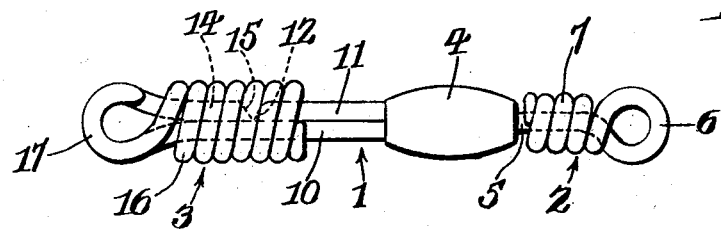
Figure 3 is a view similar to Figure 2 showing the snap in open position.
Figure 4:
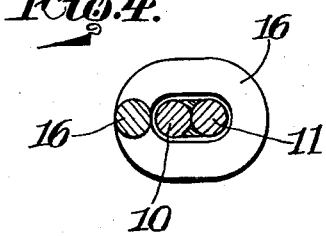
Figure 4 is a section taken on line 4—4 of Figure 3.
Figure 5:
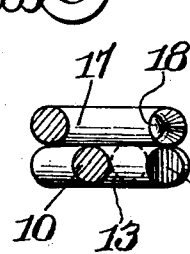
Figure 5 is a section taken on line 5—5 of Figure 3.

When the latch member 16 is positioned against the swivel 4 as illustrated in Figure 3, the outermost coil of the latch member will be disposed inwardly with respect to the beveled end 15 of the return portion 14 and the latter will spring into a position in spaced relation to the shank 10, due to the inherent resilient qualities of the portion 14 and loop 13. With the latch member 16 in this position, the eye 19 of a leader 20 may be slipped over the free ends of the return portion 14 and hook 17 to assume a position within the latter.

Figures 2, 6, 7:
Figure 2 is an enlarged top plan of the snap, showing the same in closed position.
Figure 6 is a sectional plan of a modified form of snap.
Figure 7 is a reduced plan of a pair of snaps in accordance with the form shown in Figure 6, showing the same in association with a sinker.

By forcing the eye 19 and latch member 16 in an outward direction, the eye will be moved into engagement with the loop 13 and as the outermost coil of the latch member 16 comes into contact with the beveled end 15 of the return portion 14, the latter will be forced into engagement with the shank 10 with the free end 15 thereof adjacent the outer end 12 of the shank 11 as illustrated in Figure 2. In this position the outer extremities of the hook 17 and loop 13 are in alignment and the eye 19 will be securely held within the hook 17 and loop 13.

In order to remove the eye 19, the latch member 16 is forced inwardly which causes the eye to be moved inwardly by the hook 17. When the latch member 16 has been moved inwardly a sufficient distance to clear the free end 15 of the return portion 14, the latter will spring into spaced relation to the shank 10, thereby permitting the eye to be removed over the ends 18 and 15. When the latch member is at the inner end of its path of sliding movement, the free ends of the hook 17 and loop 13 are in alignment, whereby the insertion of the eye over and its removal from such ends is facilitated.

In the embodiment illustrated in Figures 6 and 7, the snap consists of a pair of parallel shanks 21 and 22 which merge at one end into a split loop 23. The opposite end of the shank 21 is bent upon itself to provide a portion 24 which extends between the shanks 21 and 22 longitudinally thereof, and is preferably secured thereto, as by soldering or the like. The shank 22, at the end thereof opposite the loop 23 is formed with a split loop 25 which merges into a return portion 26.

Slidably mounted on the shanks 21 and 22 is a latch member 27 which is adapted to engage the return portion 26 in the same manner as the latch member 16 engages the return portion 14 in the embodiment illustrated in Figures 1 to 5 heretofore described.

The latch member 27 is preferably formed of a plurality of coils suitably cemented together as indicated at 28 to provide a smooth surface. The latch member 27 terminates at one end in a hook 29 which corresponds to the hook 17 heretofore described in connection with the embodiment shown in Figures 1 to 5. The latch member 27 terminates at its opposite end in a nose 30 which extends between the shanks 21 and 22 transversely thereof. When the latch member 27 is moved into engagement with the return portion 26, the nose 30 abuts the free end of the return portion 24.

The form of snap last described is particularly adapted to be used in pairs as illustrated in Figure 7 for detachably securing a sinker, such as 31, in order that sinkers of different weights may be used and readily interchanged. This form of snap also is particularly adapted for use in connection with hoisting lines, owing to the engagement of the nose 30 with the return portion 24.

It is thought that the many advantages of a snap in accordance with this invention will be readily apparent, and although the preferred embodiment is as illustrated and described, it is to be understood that various changes may be made in the size, shape and arrangement of parts, so long as such changes fall within the scope of the invention as defined in the appended claims.

What I claim is:

1. In a snap for connecting a trolling line leader with a hook, a pair of shanks connected together in parallel relation, one of said shanks being of materially less length than the other, the other of said shanks formed with a loop and return portion disposed outwardly with respect to the outer end of the shorter shank, said return portion extending in parallel, spaced relation to the shank on which it is formed and terminating in a beveled end disposed outwardly with respect to the outer end of the shorter shank, a latch member slidably mounted on said shanks, and a hook formed on the outer end of said latch member and having its free end disposed in spaced, opposed relation thereto.

2. In a snap for connecting a trolling line leader with a hook, a pair of shanks rigidly connected together in parallel, contacting relation, one of said shanks being of materially less length than the other, the other of said shanks formed with a loop and return portion disposed outwardly with respect to the outer end of the shorter shank, said return portion extending in parallel, spaced relation to the shank on which it is formed and provided with a beveled end, a latch member slidably mounted on said shank in concentric relation thereto, and a hook formed on the outer end of said latch member and having its free end disposed in spaced, opposed relation thereto, said hook having its free end in alignment with said beveled end when the latch member is positioned at the inner end of its path of sliding movement.

3. In a snap for connecting a trolling line leader with a hook, a pair of shanks rigidly connected together in parallel, contacting relation, one of said shanks being of materially less length than the other, the other of said shanks formed with a loop and return portion disposed outwardly with respect to the outer end of the shorter shank, said return portion extending in parallel, spaced relation to the shank on which it is formed and provided with a beveled end, a latch member slidably mounted on said shank in concentric relation thereto, and a hook formed on the outer end of said latch member and having its free end disposed in spaced, opposed relation thereto, said hook having its free end in alignment with said beveled end when the latch member is positioned at the inner end of its path of sliding movement, said latch member when moved outwardly engaging said beveled end whereby the return portion is forced into contacting, parallel relation to the shank on which it is formed.

4. In a snap for connecting a trolling line leader with a hook, a pair of shanks rigidly connected together in parallel, contacting relation, one of said shanks being of materially less length than the other, the other of said shanks formed with a loop and return portion disposed outwardly with respect to the outer end of the shorter shank, said return portion extending in parallel, spaced relation to the shank on which it is formed and provided with a beveled end, a latch member slidably mounted on said shank in concentric relation thereto, and a hook formed on the outer end of said latch member and having its free end disposed in spaced, opposed relation thereto, said hook having its free end in alignment with said beveled end when the latch member is positioned at the inner end of its path of sliding movement, said latch member when moved outwardly engaging said beveled end whereby the return portion is forced into contacting, parallel relation to the shank on which it is formed, said beveled end being adjacent and opposed to the outer end of the shorter shank and said hook and loop having their outermost extremities in alignment when the latch member is positioned at the outer end of its path of sliding movement.

5. In a trolling line snap, a pair of shanks connected together in parallel relation, one of said shanks being of materially less length than the other, the other of said shanks formed with a loop and return portion disposed outwardly with respect to the outer end of the shorter shank, said return portion extending in parallel, spaced relation to the shank on which it is formed and provided with a bevelled end, a latch member slidably mounted on said shank, and a hook formed on the outer end of said latch member and having its free end disposed at substantially a right angle and in spaced, opposed relation thereto.

In testimony whereof, I affix my signature hereto.

ERKKI SYLVANNE.